United States Patent
Lee et al.

(10) Patent No.: US 11,203,034 B2
(45) Date of Patent: Dec. 21, 2021

(54) GRAVURE COATING APPARATUS

(71) Applicant: LG Chem, Ltd., Seoul (KR)

(72) Inventors: Young Jun Lee, Daejeon (KR); Sang Min Kim, Daejeon (KR); Jae Pil Lee, Daejeon (KR); Jong Joo Min, Daejeon (KR); Yong Hee Kang, Daejeon (KR); Euiseok Sa, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/614,150

(22) PCT Filed: Nov. 30, 2018

(86) PCT No.: PCT/KR2018/015114
§ 371 (c)(1),
(2) Date: Nov. 15, 2019

(87) PCT Pub. No.: WO2019/132277
PCT Pub. Date: Jul. 4, 2019

(65) Prior Publication Data
US 2020/0144590 A1    May 7, 2020

(30) Foreign Application Priority Data

Dec. 26, 2017  (KR) .................. 10-2017-0180252

(51) Int. Cl.
*B05C 1/08*   (2006.01)
*B05D 1/28*   (2006.01)
*H01M 4/04*   (2006.01)

(52) U.S. Cl.
CPC .......... *B05C 1/0808* (2013.01); *B05C 1/0821* (2013.01); *B05C 1/0865* (2013.01);
(Continued)

(58) Field of Classification Search
CPC ... B05C 1/0808; B05C 1/0821; B05C 1/0865; H01M 10/04; H01M 4/0409;
(Continued)

(56) References Cited

U.S. PATENT DOCUMENTS 5,753,041 A    5/1998   VerMehren
8,039,044 B2  10/2011   Hayashi
(Continued)

FOREIGN PATENT DOCUMENTS

CN    1698973 A    11/2005
CN  102017242 A     4/2011
(Continued)

OTHER PUBLICATIONS

Extended European Search Report with Written Opinion for Application No. 18894828.5 dated May 25, 2020, 8 pages.
(Continued)

*Primary Examiner* — Laura Edwards
(74) *Attorney, Agent, or Firm* — Lerner, David, Littenberg, Krumholz & Mentlik, LLP

(57) ABSTRACT

Disclosed is a gravure coating apparatus including: two frames; a first support shaft which is installed between the two frames; a rotary spline which is installed between the two frames and in parallel with the first support shaft; and multiple gravure roller modules which are installed to be fitted with the first support shaft and the rotary spline; in which the multiple gravure roller modules receive rotational force from the rotary spline and move independently along the first support shaft.

11 Claims, 5 Drawing Sheets

(52) U.S. Cl.
CPC ............ *B05D 1/28* (2013.01); *H01M 4/0404* (2013.01); *H01M 4/0409* (2013.01); *B65H 2301/5114* (2013.01); *B65H 2701/19* (2013.01)

(58) Field of Classification Search
CPC .................. H01M 4/0404; Y02E 60/10; B65H 2301/5114; B65H 2701/19; B05D 1/28
USPC ................ 118/211, 212; 427/428.06, 428.08
See application file for complete search history.

(56) References Cited

U.S. PATENT DOCUMENTS

| | | | |
|---|---|---|---|
| 2002/0113855 A1* | 8/2002 | Baum | ........................ B41F 5/24 347/104 |
| 2011/0131799 A1 | 6/2011 | Ito et al. | |

FOREIGN PATENT DOCUMENTS

| | | |
|---|---|---|
| JP | 2007273126 A | 10/2007 |
| JP | 2011159434 A | 8/2011 |
| JP | 2013230475 A | 11/2013 |
| JP | WO2013080701 A1 | 4/2015 |
| KR | 19990043985 A | 6/1999 |
| KR | 20110078705 A | 7/2011 |
| KR | 20140140162 A | 12/2014 |
| KR | 20150079358 A | 7/2015 |
| KR | 20160048590 A | 5/2016 |
| KR | 101689645 B1 | 12/2016 |

OTHER PUBLICATIONS

International Search Report for Application No. PCT/KR2018/015114, dated Mar. 13, 2019, pp. 1-2.

Chinese Search Report for Application No. 201880030507.8, dated Dec. 3, 2020, pp. 1-2.

* cited by examiner

GRAVURE COATING APPARATUS

CROSS-REFERENCE TO RELATED APPLICATIONS

The present application is a national phase entry under 35 U.S.C. § 371 of International Application No PCT/KR2018/015114, filed Nov. 30, 2018, which claims priority from Korean Patent Application No. 10-2017-0180252, filed Dec. 26, 2017, the disclosures of which are incorporated herein by reference in their entirety.

TECHNICAL FIELD

The present invention relates to a gravure coating apparatus, and particularly, to a gravure coating apparatus which is used to manufacture an electrode sheet for manufacturing an electrode for a rechargeable battery.

BACKGROUND ART

There is increasing use of a rechargeable battery which may be used semipermanently by being recharged and used for a power source of a vehicle as well as a power source of a portable electronic device.

In the case of the rechargeable battery, an electrode assembly is manufactured by applying active materials onto surfaces of current collectors to configure a positive electrode and a negative electrode, and then interposing a separation membrane between the positive electrode and the negative electrode, and the electrode assembly is mounted in a cylindrical or angular metal can or a pouch-shaped casing formed of aluminum laminated sheets. In this case, an aluminum electrode sheet, which is used to form the electrode for a rechargeable battery, is provided in the form of a roll made by winding the aluminum electrode sheet in the form of a scroll. To manufacture the electrode sheet, it is necessary to perform a process of forming a coating layer on a sheet base material to reinforce insulation properties. The coating layer forms multiple parallel band shapes along connecting portions of the electrode sheets. In the related art, to form the multiple band-shaped coating layers, a gravure coating apparatus, which performs gravure coating on each of the bands one by one or has a necessary number of rollers provided at required intervals, is custom-manufactured and used. However, in the case of performing the gravure coating on each of the bands one by one, there are problems in that a large amount of manufacturing time is required and productivity is low. In the case of using the gravure coating apparatus, which has the necessary number of rollers provided at required intervals, there is a problem in that the gravure coating apparatus cannot be used if the number of bands is changed or the intervals between the bans are changed, and as a result, a new gravure coating apparatus needs to be custom-manufactured.

DISCLOSURE

Technical Problem

The present invention has been made in an effort to provide a gravure coating apparatus capable of forming coating layers while implementing various numbers of bands and various intervals between the bands.

Technical Solution

An exemplary embodiment of the present invention provides a gravure coating apparatus including: two frames; a first support shaft which is installed between the two frames; a rotary spline which is installed between the two frames and in parallel with the first support shaft; and multiple gravure roller modules which are installed to be fitted with the first support shaft and the rotary spline; in which the multiple gravure roller modules receive rotational force from the rotary spline and move independently along the first support shaft.

The gravure coating apparatus may further include multiple position sensor modules which are coupled to the multiple gravure roller modules, respectively, and the gravure roller module may include a linear stage which independently moves on the first support shaft. The gravure roller module may include a gravure roller which performs gravure coating, and a rotational force transmitting unit which is installed between the rotary spline and the gravure roller to transmit rotational force from the rotary spline to the gravure roller. The rotary spline may be formed in the form of a gear having concave and convex portions which are repeatedly formed in a circumferential direction and extend in an axial direction. The rotational force transmitting unit may include multiple gears.

The gravure coating apparatus may further include an ink container which is installed at a position corresponding to the gravure roller between the two frames. The gravure coating apparatus may further include a second support shaft which is installed between the two frames and in parallel with the first support shaft.

Another exemplary embodiment of the present invention provides a gravure coating method which is performed by using the gravure coating apparatus, the gravure coating method including: moving and disposing some gravure roller modules, which are positioned at edges of both sides among the multiple gravure roller modules, toward the two frames; and performing gravure coating by using the remaining gravure roller module except for the gravure roller modules moved and disposed toward the two frames.

Each of the multiple gravure roller modules may further include a position sensor, and the performing of the gravure coating may correct a position of the gravure roller module based on the detection by the position sensor.

Each of the gravure roller modules may include a linear stage which independently moves on the first support shaft, and the positions of the gravure roller modules may be corrected as the linear stages move and dispose some gravure roller modules toward the two frames and the position sensors perform the detection.

Only the gravure roller of the remaining gravure roller module may be disposed to come into contact with coating ink in the performing of the gravure coating by using the remaining gravure roller module except for the gravure roller modules moved and disposed toward the two frames.

Advantageous Effects

By using the gravure coating apparatus according to the exemplary embodiment of the present invention, various required numbers of bands of the band-shaped coating layers and various required intervals between the bands may be implemented.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
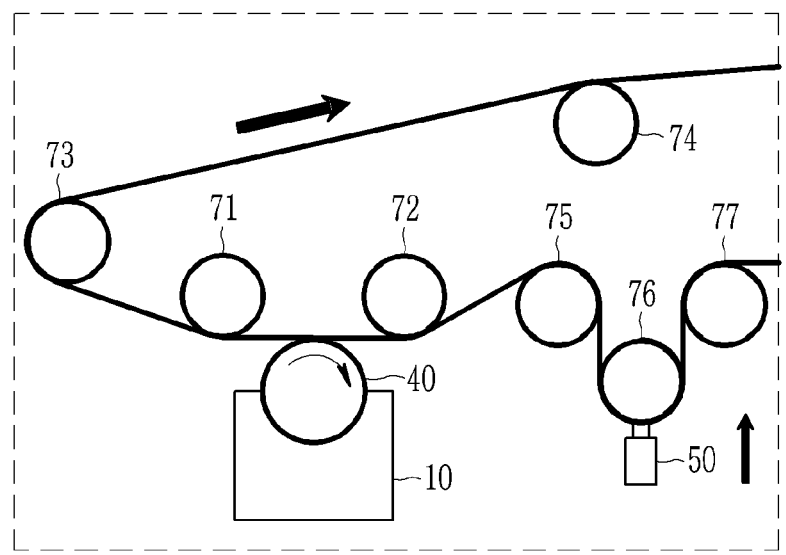
FIG. 1 is an overview of a gravure coating process using a gravure coating apparatus according to an exemplary embodiment of the present invention.

FIG. 1 is an overview of a gravure coating process using a gravure coating apparatus according to an exemplary embodiment of the present invention.

The gravure coating apparatus according to the exemplary embodiment of the present invention includes multiple guide rollers 71, 72, 73, 74, 75, 76, and 77 which are configured to load an electrode sheet base material, gravure roller modules 40 which perform gravure coating, an ink container 10 which stores gravure coating ink, and sensor modules 50 which detect positions of connecting portions of the electrode sheet base material to align the connecting portions of the electrode sheet base material with the gravure rollers. The two guide rollers 71 and 72, which are disposed adjacent to the gravure roller modules 40 among the guide rollers 71, 72, 73, 74, 75, 76, and 77, adjust the position of the electrode sheet base material so that the electrode sheet base material may be accurately in contact with the gravure rollers. To this end, cylinders are installed at both ends of the roller to adjust a vertical position of the roller. The gravure roller module 40 and the sensor module 50 are integrally coupled and moved together. The number of coupled bodies of the gravure roller modules 40 and the sensor modules 50 may be more than one, and the number of coupled bodies may be adjusted as necessary. A position of each of the coupled bodies of the gravure roller modules 40 and the sensor modules 50 may be independently changed in a width direction of the electrode sheet base material. The configuration of each of the coupled bodies of the gravure roller modules 40 and the sensor modules 50 will be described in more detail with reference to FIGS. 2 to 5.

Figure 2:
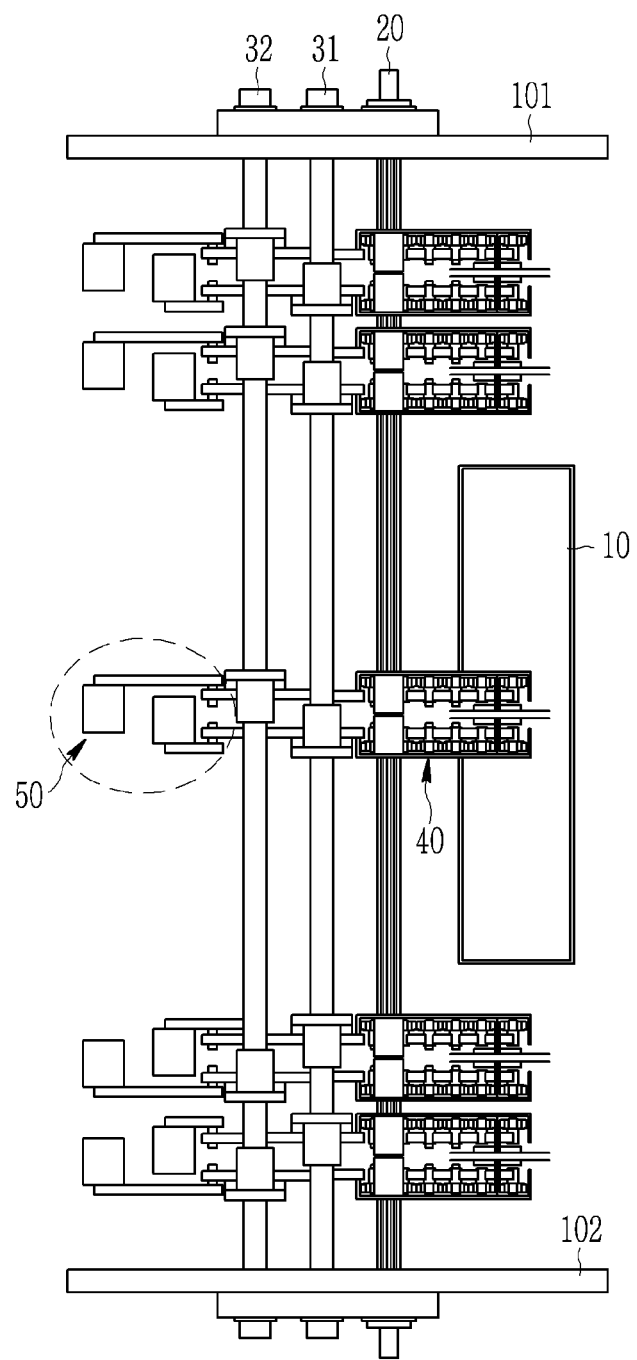
FIG. 2 is a top side view of the gravure coating apparatus according to the exemplary embodiment of the present invention, which illustrates a state in which gravure roller modules are disposed so that only one gravure roller module may be used.
Figure 3:
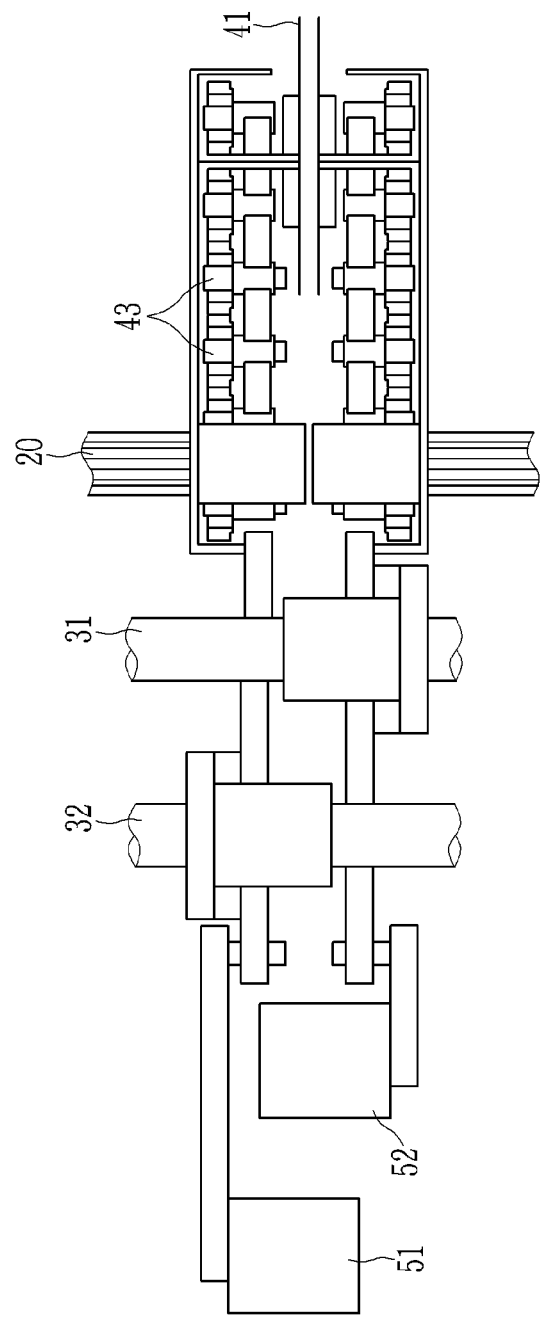
FIG. 3 is a top side view of the one gravure roller module of the gravure coating apparatus according to the exemplary embodiment of the present invention.
Figure 4:
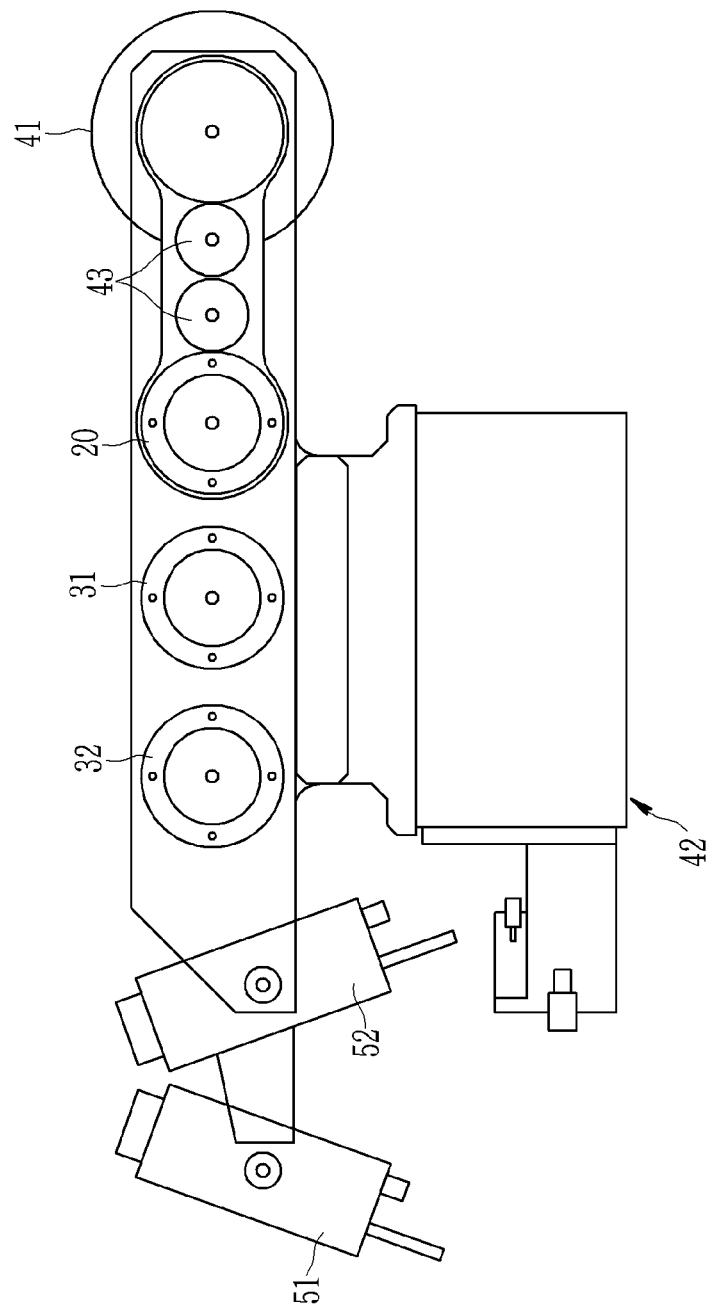
FIG. 4 is a front side view of the one gravure roller module of the gravure coating apparatus according to the exemplary embodiment of the present invention.
Figure 5:
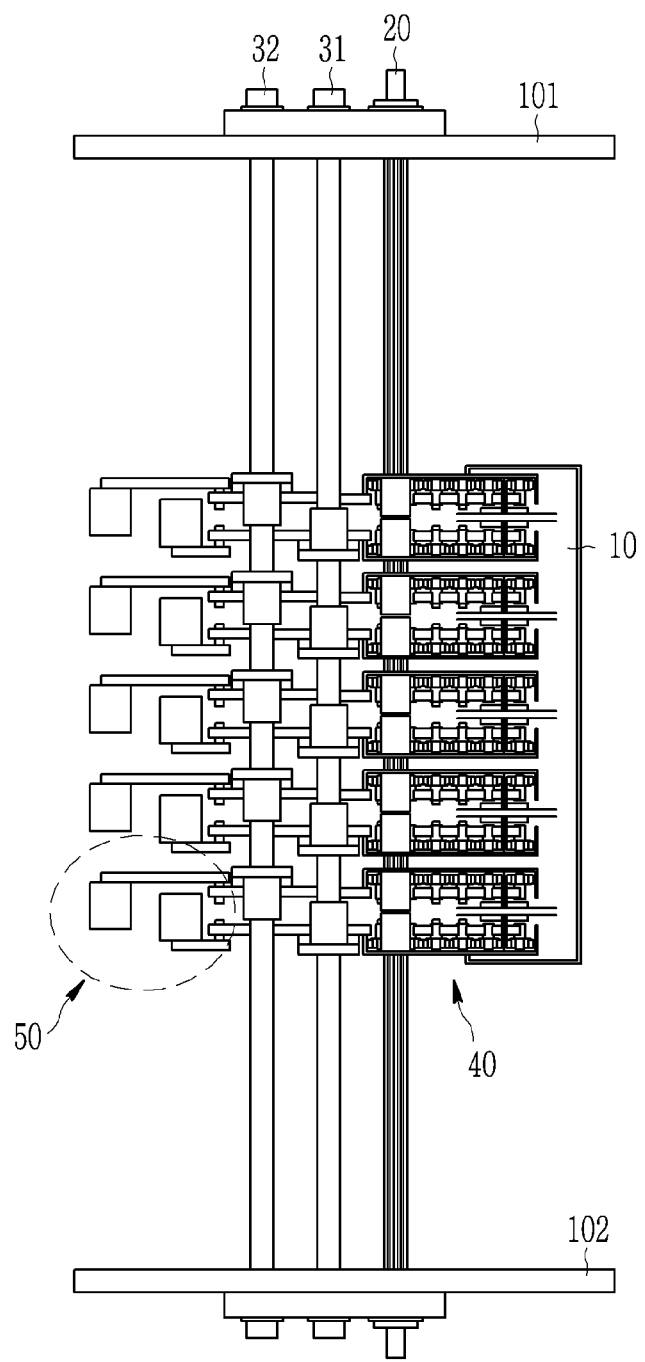
FIG. 5 is a top side view of the gravure coating apparatus according to the exemplary embodiment of the present invention, which illustrates a state in which the five gravure roller modules are collected so that all the five gravure roller modules may be used.

FIG. 2 is a top side view of the gravure coating apparatus according to the exemplary embodiment of the present invention, which illustrates a state in which the gravure roller modules are disposed so that only one gravure roller module may be used, FIG. 3 is a top side view of the one gravure roller module of the gravure coating apparatus according to the exemplary embodiment of the present invention, and FIG. 4 is a front side view of the one gravure roller module of the gravure coating apparatus according to the exemplary embodiment of the present invention. FIG. 5 is a top side view of the gravure coating apparatus according to the exemplary embodiment of the present invention, which illustrates a state in which the five gravure roller modules are collected so that all the five gravure roller modules may be used.

Referring to FIG. 2, first and second support shafts 31 and 32 and a rotary spline 20 are installed in parallel between two frames 101 and 102 of the gravure coating apparatus according to the exemplary embodiment of the present invention, and the coupled bodies of the gravure roller modules 40 and the sensor modules 50 are installed by being fitted with the first and second support shafts 31 and 32 and the rotary spline 20. FIG. 2 illustrates the five coupled bodies of the gravure roller modules 40 and the sensor modules 50, but the number of coupled bodies may be adjusted as necessary. The ink container 10, which stores the gravure coating ink, is disposed below gravure rollers 41 of the gravure roller modules 40, and the ink container 10 is disposed in a long rectangular shape in a direction parallel with the first and second support shafts 31 and 32. The ink container 10 is disposed at a central portion in an interval between the upper and lower frames 101 and 102. A long side of the ink container 10 is smaller by a predetermined width than the interval between the upper and lower frames 101 and 102. Therefore, as illustrated in FIG. 2, when the remaining four coupled bodies of the gravure roller modules 40 and the sensor modules 50, except for the center coupled body among the five coupled bodies of the gravure roller modules 40 and the sensor modules 50, are distributed and moved toward the upper and lower frames 101 and 102, the gravure rollers of the four gravure roller modules 40, except for the gravure roller of the center coupled body, are disposed at positions spaced apart from the ink container 10. In addition, as illustrated in FIG. 5, when all the five coupled bodies of the gravure roller modules 40 and the sensor modules 50 are collected at the central portion, all the gravure rollers may be positioned within the range of the ink container 10 to perform the gravure coating. However, because the ink container 10 may be replaced with an ink container having an appropriate size as necessary, there is no substantial limitation to the size of the ink container 10.

Referring to FIGS. 3 and 4, each of the coupled bodies of the gravure roller modules 40 and the sensor modules 50 in the gravure coating apparatus according to the exemplary embodiment of the present invention includes the gravure roller 41 which is disposed at a rightmost side based on the drawings, a rotational force transmitting unit 43 which transmits rotational force from the rotary spline 20 to the gravure roller 41, a linear stage 42 which moves each of the coupled bodies of the gravure roller modules 40 and the sensor modules 50 in parallel on the first and second support shafts 31 and 32, and sensors 51 and 52 which detect the positions of the connecting portions of the electrode sheet base material. Each of the coupled bodies of the gravure roller modules 40 and the sensor modules 50 is independently moved by the linear stage 42 along the first and second support shafts 31 and 32 and may be disposed at a required position. In addition, the position sensors 51 and 52 detect the accurate positions at which the gravure rollers will perform the gravure coating, and the linear stage linear stages 42 adjust the positions of the gravure rollers based on the detected positions, thereby correcting the positions of the coupled bodies of the gravure roller modules 40 and the sensor modules 50. The rotary spline 20 may be formed in the form of a gear having concave and convex portions which are repeatedly formed in a circumferential direction and extend in an axial direction. The rotational force transmitting unit 43 may include multiple gears that connect the rotary spline 20 and the gravure roller 41. In the gravure coating apparatus, all the gravure rollers 41 of the coupled bodies of the gravure roller modules 40 and the sensor modules 50 rotate together as the rotary spline 20 rotates. In a case in which one band needs to be formed by the gravure coating, only the center coupled body of the gravure roller module 40 and the sensor module 50 is disposed at the position where the coating is to be performed, but the remaining coupled bodies of the gravure roller modules 40 and the sensor modules 50 are moved and disposed toward both sides so as to be placed to be spaced apart from the ink container 10, as illustrated in FIG. 2. In a case in which five bands need to be formed by the gravure coating, all the coupled bodies of the gravure roller modules 40 and the sensor modules 50 are disposed at the required positions within the range of the ink container 10 and the gravure coating is performed, as illustrated in FIG. 5. As described above, by individually adjusting the positions of the coupled bodies of the gravure roller modules 40 and the sensor modules 50, it is possible to cope with all the cases in which the number of bands to be coated is one to five, and it is possible to cope with the situations in which the intervals between the bands to be coated are variously changed. Here, the number of coupled bodies of the gravure roller modules 40 and the sensor modules 50 may be increased to six or more or decreased to two to four.

By using the gravure coating apparatus according to the exemplary embodiment of the present invention, it is possible to form the gravure-coated bands having various numbers and intervals, and as a result, it is possible to form the coating layers having various dimensions by using the single gravure coating apparatus.

Although preferred examples of the present invention have been described in detail hereinabove, the right scope of the present invention is not limited thereto, and it should be clearly understood that many variations and modifications of those skilled in the art using the basic concept of the present invention, which is defined in the following claims, will also belong to the right scope of the present invention.

DESCRIPTION OF SYMBOLS

| | |
|---|---|
| 10: Ink container | 20: Rotary spline |
| 31, 32: First and second support shafts | 40: Gravure roller module |
| 41: Gravure roller | 42: Linear stage |
| 43: Rotational force transmitting unit | 50: Sensor module |
| 51, 52: Sensor | 71, 72, 73, 74, 75, 76, 77: Guide roller |

The invention claimed is:

1. A gravure coating apparatus for an electrode sheet base material comprising:
    two frames;
    a first support shaft disposed between the two frames;
    a rotary spline disposed between the two frames and in parallel with the first support shaft;
    multiple gravure roller modules which are positioned to be fitted with the first support shaft and the rotary spline;
    an ink container which is disposed at a position corresponding to a gravure roller between the two frames; and
    wherein the multiple gravure roller modules are configured to receive rotational force from the rotary spline and are configured to move independently along the first support shaft,
    wherein, when some of the multiple gravure roller modules which are positioned at edges of both sides among the multiple gravure roller modules, are moved and disposed toward the two frames, only a remaining gravure roller module except for the gravure roller modules moved and disposed toward the two frames is disposed to come into contact with the ink container to perform gravure coating.

2. The gravure coating apparatus of claim 1, further comprising:
    multiple position sensor modules which are coupled to the multiple gravure roller modules, respectively.

3. The gravure coating apparatus of claim 2, wherein:
    each of the gravure roller modules includes a linear stage which is configured to independently move on the first support shaft.

4. The gravure coating apparatus of claim 3, wherein:
    each of the gravure roller modules includes a gravure roller which is configured to perform gravure coating, and a rotational force transmitting unit which is disposed between the rotary spline and the gravure roller so that it is configured to transmit rotational force from the rotary spline to the gravure roller.

5. The gravure coating apparatus of claim 4, wherein:
    the rotary spline is in the form of a gear having concave and convex portions which are repeatedly formed in a circumferential direction and extend in an axial direction.

6. The gravure coating apparatus of claim 5, wherein:
    the rotational force transmitting unit includes multiple gears.

7. The gravure coating apparatus of claim 1, further comprising:
    a second support shaft which is disposed between the two frames and in parallel with the first support shaft.

8. A gravure coating method, comprising:
    providing the gravure coating apparatus according to claim 1,
    moving and disposing some gravure roller modules, which are positioned at edges of both sides among the multiple gravure roller modules, toward the two frames; and
    performing gravure coating by using a remaining gravure roller module except for the gravure roller modules moved and disposed toward the two frames.

9. The gravure coating method of claim 8, wherein:
    each of the multiple gravure roller modules further includes a position sensor, and
    the performing of the gravure coating corrects a position of the gravure roller module based on the detection by the position sensor.

10. The gravure coating method of claim 9, wherein:
    each of the gravure roller modules includes a linear stage which independently moves on the first support shaft, and
    the positions of the gravure roller modules are corrected as the linear stages move and dispose some gravure roller modules toward the two frames and the position sensors perform the detection.

11. The gravure coating method of claim 8, wherein:
    only a gravure roller of the remaining gravure roller module is disposed to come into contact with coating ink in the performing of the gravure coating by using the remaining gravure roller module except for the gravure roller modules moved and disposed toward the two frames.

* * * * *